United States Patent
Bjäre et al.

(10) Patent No.: US 7,350,211 B2
(45) Date of Patent: Mar. 25, 2008

(54) MIDDLEWARE APPLICATION ENVIRONMENT

(75) Inventors: Björn Bjäre, Lund (SE); Jonas Hansson, Lund (SE); Chi Thu Le, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 665 days.

(21) Appl. No.: 10/664,618

(22) Filed: Sep. 19, 2003

(65) Prior Publication Data

US 2004/0098727 A1    May 20, 2004

Related U.S. Application Data

(60) Provisional application No. 60/412,769, filed on Sep. 23, 2002, provisional application No. 60/412,901, filed on Sep. 23, 2002, provisional application No. 60/412,902, filed on Sep. 23, 2002.

(51) Int. Cl.
   *G06F 15/16* (2006.01)
(52) U.S. Cl. ............... 719/311; 719/317; 709/203; 709/202
(58) Field of Classification Search ............... None
   See application file for complete search history.

(56) References Cited

U.S. PATENT DOCUMENTS

| | | | |
|---|---|---|---|
| 3,831,148 A | 8/1974 | Greenwald et al. | |
| 5,689,565 A | 11/1997 | Spies et al. | |
| 5,771,240 A | 6/1998 | Tobin et al. | |
| 5,937,366 A | 8/1999 | Zbytniewski et al. | |
| 6,002,869 A | 12/1999 | Hinckley | |
| 6,044,408 A | 3/2000 | Engstrom et al. | |
| 6,049,896 A | 4/2000 | Frank et al. | |
| 6,052,524 A | 4/2000 | Pauna | |
| 6,061,709 A | 5/2000 | Bronte | |
| 6,105,154 A | 8/2000 | Wang et al. | |
| 6,112,312 A | 8/2000 | Parker et al. | |
| 6,137,802 A | 10/2000 | Jones et al. | |
| 6,269,396 B1 | 7/2001 | Shah et al. | |
| 6,279,124 B1 | 8/2001 | Brouwer et al. | |
| 6,317,659 B1 | 11/2001 | Lindsley et al. | |
| 6,353,897 B1 | 3/2002 | Nock et al. | |
| 6,389,491 B1 | 5/2002 | Jacobson et al. | |
| 6,931,429 B2 * | 8/2005 | Gouge et al. | 709/203 |

(Continued)

FOREIGN PATENT DOCUMENTS

EP    0902596 A2    3/1999

(Continued)

OTHER PUBLICATIONS

U.S. Appl. No. 10/606,684.

(Continued)

*Primary Examiner*—William Thomson
*Assistant Examiner*—Abdou K Seye
(74) *Attorney, Agent, or Firm*—Michael Cameron

(57) ABSTRACT

A software application framework includes a framework interface domain for interfacing a platform domain with application domain software of an application domain. The framework also includes a software application domain that includes a first application entity. The first application entity is adapted to interact with at least one of a second application entity, the framework interface domain, at least one utility entity, and at least one plug-in entity.

12 Claims, 1 Drawing Sheet

U.S. PATENT DOCUMENTS

| | | |
|---|---|---|
| 2001/0015654 A1 | 8/2001 | Habersetzer et al. |
| 2002/0029378 A1 | 3/2002 | Larsson |
| 2002/0069065 A1 | 6/2002 | Schmid et al. |
| 2004/0015940 A1* | 1/2004 | Heisey et al. ............... 717/168 |
| 2004/0205772 A1* | 10/2004 | Uszok et al. ............... 719/317 |

FOREIGN PATENT DOCUMENTS

| | | |
|---|---|---|
| EP | 1074911 A2 | 2/2001 |
| EP | 1 136 912 A2 | 9/2001 |
| EP | 1241905 A1 | 9/2002 |
| WO | WO 97/16938 | 5/1997 |
| WO | WO 98/19239 | 5/1998 |
| WO | WO 99/49394 | 9/1999 |
| WO | WO 00/08611 | 2/2000 |
| WO | WO 00/69084 | 11/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/51940 A1 | 7/2001 |
| WO | WO 01/88707 A2 | 11/2001 |
| WO | WO 02/27565 | 4/2002 |
| WO | WO 02/29824 | 4/2002 |
| WO | WO 02/33879 A2 | 4/2002 |
| WO | WO 02/35351 A1 | 5/2002 |
| WO | WO 02/054094 | 7/2002 |

OTHER PUBLICATIONS

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia. Lausanne, CH, vol. 17, No. 1, 1995, pp. 55-62.

U.S. Appl. No. 10/359,911.
U.S. Appl. No. 10/359,772.
U.S. Appl. No. 10/359,835.
U.S. Appl. No. 10/666,673.
U.S. Appl. No. 10/666,699.
U.S. Appl. No. 10/665,834.

Manuel Rodriquez-Martinez et al., "Automatic Deployment of Application-Specific Metadata and Code in MOCHA", Lecture Notes in Computer Science, Mar. 31, 2000 (pp. 69-85).

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway, vol. 1, Sep. 18, 2000 (pp. 484-489).

Aspects & Crosscutting in Layered Middleware Systems by Lodewiik M.J. Bergmans et al.; Trese Group—Center for Telematics and Information Technology (CTIT); pp. 1-3.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

A Layered Approach to Building Open Aspect-Oriented Systems by Paniti netinant et al.; Communications of the AC; Oct. 2001; vol. 44, No. 10; pp. 83-85.

Aspect-Oriented Programming by Silvia Breu; pp. 1-22.

Draft: Aspect-Design in the Building-Block Method by Jurgen K. Muller, Philips Research Laboratories; International Workshop on Aspect-Oriented Programming at ECOOP, 1992; 3 Pages.

A Version Model for Aspect Dependency Management by Elke Pulvermuller et al.; J. Bosh (Ed.): GCSE 2001, LNCS 2186, Springer-Verlag Berlin Heidelberg 2001, pp. 70-79.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability—The Optima Framework" 3G Mobile Communication Technologies, No. 477, XP002266662, Mar. 26-28, 2001, (pp. 241-246).

K. Moessner, et al., "Terminal Reconfigureabilty—The Software Download Aspect", 3G Mobile Communication Technologies, Conference Publication, No. 471, XP002266663, (pp. 326-330).

Sun Microsystems; "Mobile Information Device Profile (JSR-37), Java 2 Platform, Micro Edition, 1.0a"; JCP Specification, Dec. 15, 2000, pp. 25-27; 39-41; abstract; table 3-1; figure 3-1.

Sun Microsystems; "Connected Limited Device Configuration (JSR-30), Java 2 Platform, Micro Edition, 1.0a" JCP Specification, May 19, 2000; pp. 1-1; 4-1.

European Patent Office; International Search Report completed Mar. 15, 2006.

* cited by examiner

MIDDLEWARE APPLICATION ENVIRONMENT

RELATED APPLICATION(S)

This application claims priority from and incorporates herein by reference the entire disclosure of U.S. Provisional Application Ser. No. 60/412,769, filed Sep. 23, 2002. This application claims priority from and incorporates herein by reference the entire disclosure of U.S. Provisional Application Ser. No. 60/412,901, filed Sep. 23, 2002. This application claims priority from and incorporates herein by reference the entire disclosure of U.S. Provisional Application Ser. No. 60/412,902, filed Sep. 23, 2002. This application incorporates herein by reference the entire disclosure of each of the following U.S. Patent Applications: 1) U.S. patent application Ser. No. 10/359,911, filed Feb. 7, 2003. 2) U.S. patent application Ser. No. 10/359,772, filed Feb. 7, 2003; and 3) U.S. patent application Ser. No. 10/359,835, filed Feb. 7, 2003.

TECHNICAL FIELD

The present invention relates to frameworks for execution of client software applications, and more particularly, to frameworks for providing high-level application support for the execution of client software applications.

BACKGROUND OF THE INVENTION

An optimal application framework enables a mobile equipment real-time software developer to focus and spend development time adding application-related value to a product while still having the flexibility to achieve real-time performance. However, developers of real-time application software are often required to spend an inordinate amount of time writing code that only serves the purpose of supporting actual application-related functionality (i.e., so-called plumbing code) for new software applications. In addition, writing this lower-level plumbing code is usually considered to be more error-prone than writing higher level application software.

Most existing frameworks offer an environment that is either too generic or too restricted. Most frameworks are too generic in the sense that they offer only low-level services that are similar to primitives supported by most operating systems (OS) and that offer considerable flexibility but also require generation of considerable plumbing code.

Other frameworks are too restricted in terms of flexibility in that they: 1) offer limited possibilities to dynamically add new functionality to the framework or scale away code or functionality not needed; 2) do not offer multithreading capabilities; or 3) support only one event notification model (e.g., message (event pull) or callback (event push), but not both). In addition, most frameworks do not address legacy problems that are created when a developer ports previous investments in code to a new framework. Many of the legacy problems listed above arise from a structural mismatch (e.g., different OS paradigms) between an old system and the framework to which the code is to be ported.

By eliminating any unnecessary (e.g., OS specific) paradigm-related functionality and offering clean abstract support for existing basic paradigms, the porting work is facilitated. From an application programmers' perspective, it would thus be desirable to maximize a ratio between application code and necessary, but from an application developer's point of view, unproductive support code.

At present, several frameworks exist that export similar services to applications (e.g., PalmOS, Brew). Existing frameworks differ not only in terms of underlying support mechanisms (e.g., single/multi-threading), paradigms (e.g., function-based/object-oriented), but also with respect to a level of support and flexibility offered to applications. However, many frameworks do not provide a high-level application-domain environment, but instead merely allow a system to be divided into low-level processes, etc. . . . , in a similar fashion to a standard operating system. The application developer is thus left to either include standard functionality in the application code or develop in-house high-level application support.

SUMMARY OF THE INVENTION

In an embodiment of the invention, a method of using a software application framework includes interfacing a platform domain with application domain software of an application domain via a framework interface domain. The method also includes a first application entity of a software application domain interacting with at least one of a second application entity, the framework interface domain, at least one utility entity, and at least one plug-in entity.

In another embodiment of the invention, a software application framework includes a framework interface domain for interfacing a platform domain with application domain software of an application domain and a software application domain. The software application domain includes a first application entity. The first application entity is adapted to interact with at least one of a second application entity, the framework interface domain, at least one utility entity, and at least one plug-in entity.

BRIEF DESCRIPTION OF THE DRAWINGS

A more complete understanding of the method and apparatus of the present invention may be obtained by reference to the following Detailed Description when taken in conjunction with the accompanying Drawing, wherein.

DETAILED DESCRIPTION OF EXEMPLARY EMBODIMENTS OF THE INVENTION

Figure 1:
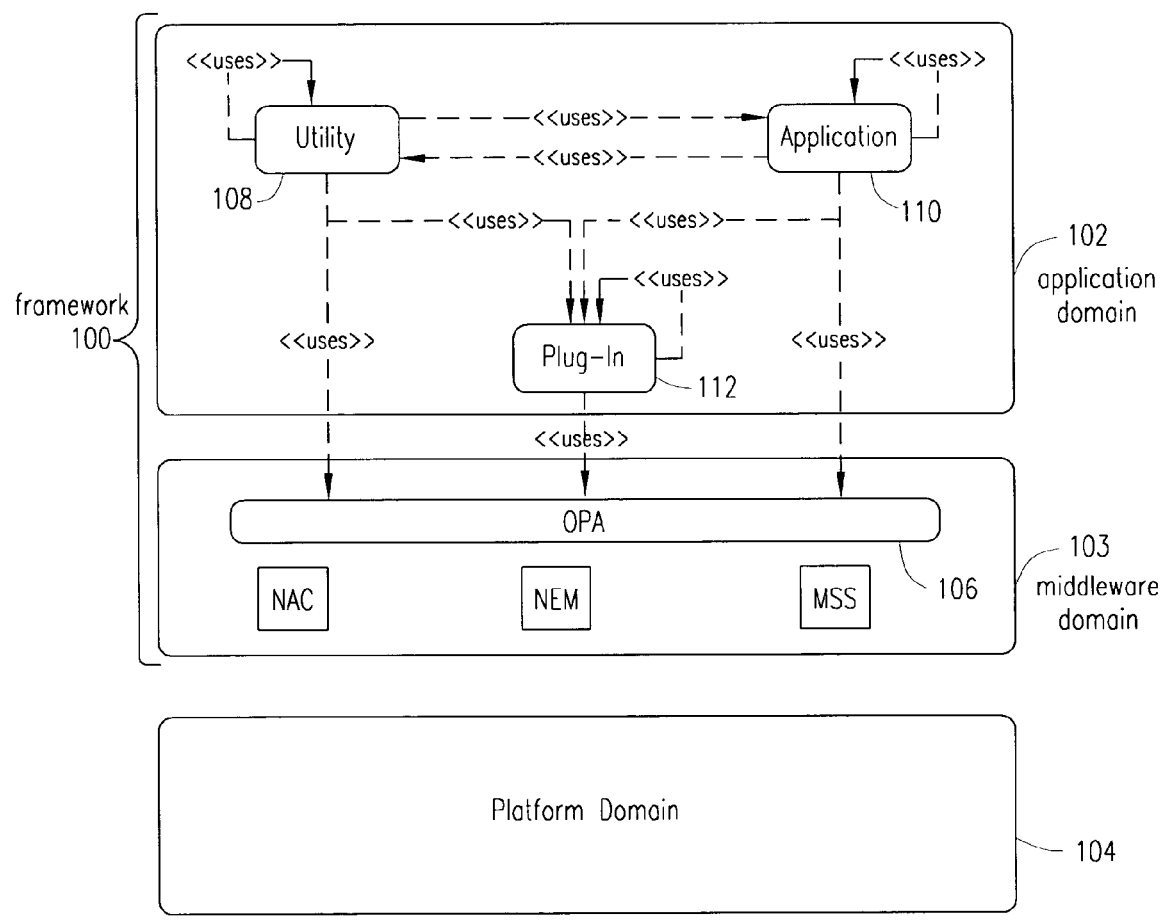
FIG. 1 is an illustration of a framework in accordance with principles of the present invention.

Mobile-equipment embedded software typically executes in a native environment of a central processing unit (CPU) of the mobile equipment. For purpose of this application, the term mobile equipment includes any mobile computing or communication device such as, for example, mobile telephones, personal digital assistants, laptop computers, and the like. The term native implies that the software has full access to functionalities of the mobile equipment (since the software is typically running machine code) and also implies that it is very difficult to ensure that the software does not interfere with other functionalities in an undesired way with respect to the mobile equipment. In contrast, in other solutions such as Java, the source code is encapsulated in a software package that acts as a so-called virtual machine. The virtual machine is in total control of what the code running within the encapsulation is and is not permitted to do.

To be efficient, the encapsulation is almost always tied to the specification of the programming language being used. For native languages, such as, for example, C and C++, such encapsulation is not possible. However, the idea of encapsulation is still useful for achieving isolation between service implementations and client implementations. The term isolation means controlling dependencies in such a way that both client code and server code can evolve independently over time with minimal mutual disturbances. Embodiments of the present invention provide a pattern for a native execution environment that encapsulates and abstracts such dependencies but does not offer the full protection capacity available in a virtual environment such as, for example, Java.

FIG. 1 is a block diagram that illustrates a framework in accordance with principles of the present invention. A framework 100 includes an application domain 102 and a middleware domain 103. Also shown in interaction with the framework 100 is a platform domain 104. The framework 100 includes a rulebook for the application domain 102, including all application domain software operating within the application domain 102. Shown within the middleware domain 103 is an open-platform application-programming interface (open platform API) 106. Shown within the application domain 102 is a utility entity 108, an application entity 110, and a plug-in entity 112. The open platform API 106 is a framework interface layer in a middleware domain 103 of a mobile platform (not shown in FIG. 1). The open platform API (OPA) 106 separates the utility entity 108, the application entity 110, and the plug-in entity 112 (collectively, application domain software) in the application domain 102 from the platform domain 104 and provides an extensive API from the platform domain 104 to the application domain software. The application entity 110, the utility entity 108, and the plug-in entity 112 interface with the platform domain 104 via the OPA 106.

All services in the platform domain 104 are accessed via the OPA 106. The OPA 106 structures services into categories and subcategories. Inside a given subcategory, the services are provided by components based on a component model. The OPA 106 provides both synchronous (blocking) and asynchronous (non-blocking) services.

Each of the entities 108, 110, and 112 is built up by one or more of the components according to a component-model standard. A principal component of each of the entities 108, 110, and 112 is mandatory, while further components (e.g., internal components) are optional.

The component-model standard dictates how the entities 108, 110, and 112 and services of the OPA 106 are implemented. The components, which are developed independently from one another, are defined. The components interact with each other via defined interfaces. The component-model standard also introduces a standard for dynamic linkage between component instances where references to interfaces are retrieved in runtime.

The OPA 106 is an easy and efficient interface towards functionality of the platform domain 104 and is based on a modern, object-based paradigm. The OPA 106 eliminates the need for the application developer to have to deal with details in the implementation of the mobile platform. The OPA 106 also reduces specific hardware and OS dependencies for the application domain software.

A software development kit for the development of the application domain software allows a developer to create the entities 108, 110, and 112. The application domain software thus developed may be uploaded/downloaded and installed in a target environment, which can be, for example, the mobile platform or a simulation environment.

An application model for the application domain software sets basic rules and defines an environment for the application domain software. The application model provides the application domain software with a real-time multitasking environment and a natural way of controlling the application domain software and using the services of the platform domain 104.

In accordance with principles of the present invention, the application domain software is encapsulated into a native virtual execution environment that eliminates any explicit application dependencies on an actual operating system used in the mobile platform. The framework 100 does not favor any particular operating-system-specific paradigms, but rather focuses on supplying a minimal but complete set of services that cover otherwise neglected needs of a real-time application environment in terms of offering high-level functionality that minimizes so-called plumbing code.

For example, most operating systems and application environments offer only a single unit of software decomposition support (e.g., tasks, processes, etc.) Embodiments of the present invention provide the framework 100, starting with the components in the application domain 102 that evolve into the higher-level entities 108, 110, and 112. Thus, the utility entity 108, the plug-in utility 112, and the application entity 110, along with the OPA 106, form a uniform and seamless environment for handling different problem areas. The framework 100 may be combined with a flexible dual-mode solution for exchanging services between different types of entities. The dual-mode solution supports at least two functional software mechanisms for basic event notification handling: 1) procedure-based (i.e., callback) handling; and 2) message-based handling.

Each of the utility entity 108, the plug-in entity 112, and the application entity 110 is modeled with a specific problem area in mind and resolves a number of issues associated with the particular specific problem area. The application entity 110 is tailored toward active application clients that hold one to several threads and toward simplification of writing application-oriented functionalities. The term active means in control of one to several threads. The application entity 110 is the only active entity of the application domain 102. The application entity 110 is a separate executable entity that owns at least one thread.

The application entity 110 is separately executable and is the most fundamental entity in the application domain software. Typical examples of the application entity 110 are a web browser, phone book, and game applications. At least one of the application entity 110, a root application, must exist in the framework 100. As shown in FIG. 1, the application entity 110 may use the services of the utility entity 108, the plug-in entity 112, the OPA 106, and other applications (not shown).

The application entity 110 owns at least one thread, the main thread. The main thread is created automatically at application start-up and control of the thread is transferred to the application via an application interface that is mandatory for all applications to export and implement. The application interface is used to control the lifecycle and execution of the application entity 110. The application entity 110 may create additional threads, termed sub-threads, which execute in parallel. If the application entity 110 starts to use an additional thread, the control of the sub-thread is transferred to the application via a thread interface that is mandatory, which is used to control the lifecycle and execution of the sub-thread.

The application entity 110 is built up of one or more components. The main component of the application entity 110 is mandatory. The main component, which may also be referred to as the application core component, is instantiated when the application entity 110 is started. The application entity 110 must implement the mandatory application interface, that is, where the main thread starts to execute. Additional, internal, components of the application entity 110 are optional.

The plug-in entity 112 is a passive entity that statically or dynamically extends the OPA 106 so that client applications see no difference between the behavior of a basic (i.e., platform) service and an extension (i.e., plug-in based) service. The utility entity 108 facilitates various adaptations in the framework 100, including, for example, redefining existing interfaces, acting as proxy/stubs in inter-application communications, performing a glue adaptation functionality between standard functionalities and legacy software, etc. . . . The plug-in utility 112 is used to extend the services of the OPA 106 while behaving like a service of the OPA 106 from a client perspective.

The utility entity 108 is a passive entity that imposes a minimal set of rules on application developers. The utility entity 108 is a flexible entity that may be used to provide simpler services and to provide adaptation for legacy customer code. Services that do not need parallel execution are typically provided by the utility entity 108. If more advanced services that need parallel execution are needed in the application domain 102, these services are typically developed as applications.

The utility entity 108 is a flexible entity normally used to provide simpler services to other entities. The utility entity 108 is invoked on a thread owned by the caller (e.g., the application entity 110); that is, the utility entity 108 normally does not create or own any threads. However, if necessary, the utility entity may create temporary threads that are associated with a service request and will exist for the duration of such a request until the service has run to completion. Due to its flexibility, the utility entity 108 be used for different purposes. For example, the utility entity 108 may provide library services that need to be shared between applications, be used to extend the OPA 106 functionality like the plug-in entity 112, be used to support legacy application code not written for the OPA 106, or be used in application-to-application communications to facilitate a context switch between applications.

As shown in FIG. 1, the utility entity 108 can use application entities, plug-in entities, services of the OPA 106, as well as other utility entities in order to carry out its functionality. The utility entity 108 is built up of one or more components. A main component of the utility entity 108 is mandatory. The main component is instantiated when the utility entity 108 is instantiated. Additional, internal, components are optional. The utility entity 108 is considered passive, as it will not create or maintain any threads outside the context and duration of an inbound external service request. Instead, the utility entity 108 normally executes on the callers' thread (e.g., an application thread).

The entities 108, and 110, and 112 access the platform functionality only through OPA 106. Although only the utility entity 108, the application entity 110, and the plug-in entity 112 are shown in FIG. 1, it should be understood that more than one of each of the entities 108, 110, and 112 may be developed and used simultaneously in the framework 100 as needed.

Each of the entities 108, 110, and 112 is a specific entity with well-defined characteristics aimed at supporting a specific development scenario or set of development scenarios. Thus, each of the entities 108, 110, and 112 acts as a complement to each other in order to provide complete overall support of the application domain 102. FIG. 1 illustrates how the entities 108, 110, and 112 are inter-related and may use each other. FIG. 1 assumes a basic and thin abstraction layer that exports services according to well-defined mechanisms of the OPA 106. The entities 108, 110, and 112, each of which runs on top of the OPA 106, each play a different role and are subject to different constraints based on each role, as explained further below.

The application entity 110 offers extensive support in order to minimize any handling not relevant to execution of application-specific functionality of client code. The application entity 110 differs from the entities 108 and 112 in the sense that the application entity 110 drives execution of application-domain functionality. The application entity 110 is assigned a main thread when initially invoked (i.e., launched). The application entity 110 is granted the main thread control via the OPA 106. However, once the application entity 110 has been invoked, the application entity 110 is able to drive the code execution from that point forward via the main thread. Client code written in accordance with a paradigm of the application entity 110 is encapsulated with respect to any hard dependencies on an actual operating system environment by using virtual replacements for all such mechanisms.

All entities may depend on the OPA 106. In particular, the application entity 110 is characterized by the following properties:

The application entity 110 may depend on the OPA 106.

The application entity 110 may depend on other application entities, as well as on the utility entity 108 and the plug-in entity 112.

The application entity 110 must support and adhere to the component model.

The application entity 110 owns at least one thread, which is automatically created at start-up.

The application entity 110 must implement a mandatory inbound interface to be invoked at, for example, launch, system broadcast messages, etc. . . .

A "main/init" core application of the application entity 110 is invoked/launched automatically at system startup. Subsequent invocations of additional applications of the application entity 110 are under the control of the application domain 102.

The plug-in entity 112 extend the functionality of the OPA 106 with application-oriented functionality (e.g., phonebook or high-level graphics). From an application perspective, the OPA 106 is interpreted so that the plug-in entity 112 is perceived as being a part of the OPA 106, which implies that the plug-in entity 112 behaves like the OPA 106 in every logical and formal aspect, although the plug-in entity 112 resides on top of the OPA 106 and depends on the OPA 106 functionality. The aspects referred include, but is not limited to, paradigms (e.g., function/object based) used, message handling, underlying component model and exception handling.

The plug-in entity 112 is typically created and delivered by a platform provider for the purpose of extending functionality of services of the OPA 106. The plug-in entity 112 may, for example, provide simple library-like functionality, but may also provide services that are more advanced, with execution in threads owned by the plug-in entity 112. An example of a typical plug-in service is a high-level graphical user interface.

In particular, the plug-in entity 110 is characterized by the following properties:

The plug-in entity 112 may depend on the OPA 106.

The plug-in entity 112 is not permitted to depend on the existence of application entities nor on the existence of utility entities. However, the plug-in entity 112 is permitted to depend on the existence of other plug-in entities.

The plug-in entity 112 must support and adhere to the component model.

The plug-in entity 112 must export one or more services via the component model.

The plug-in entity 112 is invoked only when a service exported by the plug-in entity 112 is called.

The plug-in entity 112 may act as server holding one or several local active thread, even when no plug-in service has been invoked.

The plug-in entity 112 implements all message, event and notification models of the OPA 106 (e.g., callback and full message model).

The plug-in entity 112 implements full undesired event (error) handling support as specified by the OPA 106.

The utility entity 108 imposes a minimum of restrictions on the application code. The utility entity 108 facilitates buffering and shielding of application legacy code with respect to the OPA 106 and existing plugins, thus minimizing the number of requirements imposed on the legacy code in terms of new paradigms or restrictions. A result of this lack of restrictions is that the utility entity 108 offers a minimum of application support, since the utility entity 108 in terms of exported interfaces only enforces the code to the extent necessary to adhere to component model of the OPA 106. However, a utility must still honor the rules associated with the use of OPA and existing plugins, in case it has dependencies on such entities. The resulting freedom from restrictions may be used to develop library functionalities specific to the client applications as well as to allow customer with a substantial legacy base to gradually converge to the OPA application model. In particular, the utility entity 108 are characterized by the following properties:

The utility entity 108 may depend on the OPA 106.

The utility entity 108 may depend on other utility entities, as well as on application entities and plug-in-entities.

The utility entity 108 must support and adhere to the component model.

The utility entity 108 must export one or more services via the middleware component-based (ECM) interface.

The utility entity 108 is invoked on and executes on a caller's thread.

The utility entity 108 may spawn threads, but the life cycle of those threads is limited to the context of, or session associated with, a service invocation.

Must comply with any rules associated with using OPA and/or plugins if dependencies on such entities exist.

The previous description is of a preferred embodiment for implementing the invention, and the scope of the invention should not necessarily be limited by this description. The scope of the present invention is instead defined by the following claims.

What is claimed is:

1. A software application framework embodied as computer software contained in a memory that is executable on computer hardware located within a mobile equipment adapted to provide a high-level application-domain environment in the mobile equipment, comprising:

a framework interface domain further comprising an open platform application programming interface (OPA), for interfacing a platform domain with application domain software of an application domain;

a software application domain comprising at least one application entity wherein the software application domain further comprises at least one utility entity and at least one plug-in entity;

wherein the at least one utility entity is adapted to use at least one of:
the framework interface domain;
at least one application entity;
the at least one plug-in entity; and
the at least one utility entity, wherein the at least one application entity, the at least one plug-in entity and the at least one utility entity comprises encapsulated code; and wherein the at least one plug-in entity is adapted to use the framework interface domain and wherein the application entity is adapted to own at least one thread that is automatically created upon start-up of the application entity;

wherein the at least one application entity is adapted to interact with at least one of:
the framework interface domain;
the at least one utility entity; and
the at least one plug-in entity; and wherein the software application framework includes a rulebook for the application domain and is embodied as computer software contained in a memory that is executable on computer hardware located within a mobile equipment.

2. The software application framework embodied as computer software contained in a memory that is executable on computer hardware located within a mobile equipment adapted to provide a high-level application-domain environment in the mobile equipment of claim 1, wherein the plug-in entity is adapted to extend the functionality of the platform domain.

3. The software application framework embodied as computer software contained in a memory that is executable on computer hardware located within a mobile equipment adapted to provide a high-level application-domain environment in the mobile equipment of claim 1, wherein the plug-in entity is adapted to appear to be a part of the framework interface domain.

4. The software application framework embodied as computer software contained in a memory that is executable on computer hardware located within a mobile equipment adapted to provide a high-level application-domain environment in the mobile equipment of claim 1, wherein the utility entity is adapted to buffer and shield legacy code.

5. The software application framework embodied as computer software contained in a memory that is executable on computer hardware located within a mobile equipment adapted to provide a high-level application-domain environment in the mobile equipment of claim 1, wherein:

the software application framework uses a dual-mode message-exchange procedure; and the procedure comprises use of procedure/stack-based handling and message/serialization-based handling.

6. The software application framework embodied as computer software contained in a memory that is executable on computer hardware located within a mobile equipment adapted to provide a high-level application-domain environment in the mobile equipment of claim 1, wherein the application domain minimizes a need for support code.

7. A method of using a software application framework embodied as computer software contained in a memory that is executable on computer hardware located within a mobile equipment adapted to provide a high-level application-domain environment in a mobile equipment, the method comprising:

interfacing a platform domain with application domain software of an application domain via a framework interface domain further comprising an open platform application programming interface (OPA) wherein the application domain comprises at least one utility entity and at least one plug-in entity,;

using, by the at least one utility entity, at least one of:
        the framework interface domain;
        the at least one application entity,
        the at least one plug-in entity; and
        the at least one utility entity, wherein the at least one application entity, at least one plug-in entity, and at least one utility entity comprises encapsulated code;

using, by the at least one plug-in entity, the framework interface domain and the at least one application entity of the application domain wherein the at least one application entity owns at least one thread that is automatically created upon start-up of the application entity, interacting, by the at least one application entity, with at least one of:
        the framework interface domain;
        the at least one utility entity; and
        the at least one plug-in entity; and wherein the software application framework includes a rulebook for the application domain and is embodied as computer software contained in a memory that is executable on computer hardware located within a mobile equipment.

8. The method of claim 7, wherein the plug-in entity extends the functionality of the platform domain.

9. The method of claim 7, wherein the plug-in entity appears to be a part of the framework interface domain.

10. The method of claim 7, wherein the utility entity buffers and shields legacy code.

11. The method of claim 7, further comprising:
    using, by the software application framework, of a dual-mode message-exchange procedure; and
    wherein the procedure comprises use of procedure/stack-based handling and message/serialization-based handling.

12. The method of claim 7 wherein the application domain minimizes a need for support code.

* * * * *